UNITED STATES PATENT OFFICE.

CHARLES GOODYEAR, OF NEW HAVEN, CONNECTICUT.

IMPROVEMENT IN FELTING INDIA-RUBBER WITH COTTON FIBER.

Specification forming part of Letters Patent No. 3,633, dated June 15, 1844; Reissue No. 157, dated December 25, 1849.

*To all whom it may concern:*

Be it known that I, CHARLES GOODYEAR, of the city and county of New Haven, State of Connecticut, have invented a certain new and useful fabric, which I denominate "India-Rubber Bellum;" and I hereby declare that the following is a full, clear, and exact description of the principle or character which distinguishes it from all other things before known, and of the method of making, compounding, and using the same.

It has long been essayed to combine the fibers of cotton or other fibrous substance or substances with sheets of india-rubber or the compounds thereof, with a view to make a thin fabric possessing lightness, strength, and durability; but until my present invention these attempts have not been attended with any marked success. The methods heretofore practiced or essayed were, first, to grind or mix together the fibers of cotton or other substance and the india-rubber, and then forming it into sheets by passing the mass between calender-rollers, in the manner of making sheet india-rubber; secondly, after making a sheet of india-rubber or its compounds, coating the surface with flakes of fibrous substance or substances, again rolling, then another coating of flakes, and so on until the required thickness was obtained; and, thirdly, to cement a coating of india-rubber into cotton or other bats. The first and second of these methods are defective, for the reason that in the operation of grinding or mixing and drawing between the calendering-rollers to obtain the thickness of sheet required, the fibers are necessarily broken up, and thus lose their strength, so that the fabric thus produced actually possesses no more, if as much, strength as if made of india-rubber alone or any of its compounds; and the third gives too much thickness and but little strength, for the bat of fibers in itself possesses comparatively but little strength, and when cemented to the sheet of india-rubber the two are only connected along their contiguous surfaces, and the india-rubber will therefore be strengthened only by the fibers in actual contact with it.

My invention consists in combining the fibers of cotton or other substance with a sheet of caoutchouc or india-rubber prepared in any desired manner by laying a bat or piece of cotton or other fibrous substance onto a previously-prepared sheet of india-rubber or caoutchouc of the required thickness and in the "green state" as it is termed—that is, before the india-rubber has been subjected to the curing process, and then pressing the fibers of the fleece into the gum by subjecting the whole to the requisite pressure while the sheet of gum is in a soft state.

The mode of procedure which I have practiced with success is to take a sheet of india-rubber prepared after the manner secured to me by Letters Patent bearing date the 15th day of June, 1844, and of about the thickness of the intended fabric, and while it is in what is called the "green state." This is rolled onto a beam, with a sheet of cotton or other cloth interposed, to prevent the surfaces of the rubber from adhering. The beam thus prepared is placed on appropriate bearings near the usual calendering-rollers. A thin fleece or bat of cotton or other fibrous substances is in like manner rolled upon a beam, and also mounted near the calendering-rollers. One end of the sheet of india-rubber, without the cloth, and one end of the fleece or bat of fibers, are put together in the bite of the calendering-rollers, and thus one on the other rolled through, the rollers being so adjusted as to press and force the fibers of the bat or fleece into the sheet of india-rubber, or so much of them as the india-rubber will receive, and the surplus, if any, is then to be stripped or rubbed off. Instead of this, the sheet of india-rubber can be formed at the same operation by having a series of calendering-rollers—say four—one above the other. The mass of india-rubber taken from the grinding-machine is applied between the top and second rollers and formed into a sheet, which from this passes between the second and third rollers, where it is reduced to the required thickness. Thence it passes to the bite of the third and fourth rollers, where the bat or fleece of cotton or other fibrous substance is introduced with it, to be incorporated as above described. In either of these ways the fibers are thoroughly incorporated with the india-rubber, and, being carried through between the rollers but once, or if more than once without materially stretching the sheet, the fibers retain their tenacity, and, being cemented or agglutinated by the gum or india-rubber, produce a fabric of great strength and but little or no elasticity, and with a surface entirely different from any other fabric heretofore known. The degree of thinness within which such a fabric can be produced is only limited by the thickness of the fibers, for the sheet of india-rubber may be so thin as to receive only one or two ranges of fibers not attached to the surface of the india-rubber, but embedded in it. A fabric, however, so thin as this would be of but little practical utility, and would require a nicety of mechanical adjustment in the calendering-rollers not well adapted to practical purposes, and this is merely stated to give a clear notion of the character of the fabric produced by my invention. After the fabric has been thus prepared it may be subjected to any of the cooling processes.

It will be obvious from the foregoing that small sheets of this fabric can be made in any kind of platen-press by the application of direct pressure to incorporate the fibers of the fleece or bat with the sheet of india-rubber, and that, instead of preparing the fleece or bat of fibrous substance separately, it may be formed directly on the sheet of india-rubber, for such variations will not in any manner vary the principle or character of my invention, which, as previously stated, consists in forcing the fibers of the fleece or bat into the prepared sheet of india-rubber without subjecting them to a stretching operation after they have been incorporated, and thus retaining their full strength in additon to the strength due to the india-rubber, and therefore it will be obvious that this can be effected by any mechanical means which will not materially injure the fibers.

What I claim as new and of my invention is—

Incorporating the fibers of cotton or other substance with india-rubber by pressing the fibers of a fleece or bat of cotton or other fibrous substance into a sheet of india-rubber in the green state without subjecting the fibers, after they have been incorporated, to a stretching or drawing operation, substantially as herein described.

CHARLES GOODYEAR.

Witnesses:
BENJN. S. MULLITT,
ALFRED ROE.